US006262874B1

(12) United States Patent
Stoll et al.

(10) Patent No.: US 6,262,874 B1
(45) **Date of Patent: *Jul. 17, 2001**

(54) CIRCUIT DEVICE

(75) Inventors: Kurt Stoll, Esslingen; Walter Suchy, Stuttgart, both of (DE)

(73) Assignee: Festo AG & Co., Esslingen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/148,303

(22) Filed: Sep. 4, 1998

(30) Foreign Application Priority Data

Sep. 5, 1997 (DE) ........................................ 297 15 925 U

(51) Int. Cl.[7] ................................ G05F 1/56; H02M 3/10
(52) U.S. Cl. ........................................ 361/160; 361/154
(58) Field of Search ............................ 361/160, 152–156, 361/170

(56) References Cited

U.S. PATENT DOCUMENTS

| | | | | |
|---|---|---|---|---|
| 4,605,983 | * | 8/1986 | Harvey | 361/154 |
| 4,812,945 | * | 3/1989 | D'Onofrio | 361/154 |
| 4,825,333 | * | 4/1989 | Clive et al. | 361/154 |
| 4,949,215 | * | 8/1990 | Studtmann et al. | 361/154 |
| 4,978,865 | * | 12/1990 | Hartmann et al. | 361/154 |
| 5,053,911 | * | 10/1991 | Kopec et al. | 361/154 |
| 5,311,548 | | 5/1994 | Nikolaus . | |
| 5,757,605 | * | 5/1998 | Furukawa | 361/154 |
| 5,835,330 | * | 11/1998 | Kirschner et al. | 361/154 |
| 5,933,313 | * | 8/1999 | Furukawa | 361/154 |

FOREIGN PATENT DOCUMENTS

| | | |
|---|---|---|
| 38 05 031 A1 | 8/1989 | (DE) . |
| 38 24 526 A1 | 1/1990 | (DE) . |
| 39 10 810 A1 | 10/1990 | (DE) . |
| 40 06 838 A1 | 9/1991 | (DE) . |
| 41 13 433 A1 | 1/1992 | (DE) . |
| 0 266 743 A2 | 5/1988 | (EP) . |
| 4 417873 A1 | 3/1991 | (EP) . |

OTHER PUBLICATIONS

SAX, "Verlustarme Ansteuerung von Aktuatoren," *Elektronik*, 23: 142–152 (Nov. 13, 1987).

* cited by examiner

*Primary Examiner*—Fritz Fleming
(74) *Attorney, Agent, or Firm*—Hoffmann & Baron, LLP

(57) ABSTRACT

A circuit device for the regulation of the coil current flowing through a solenoid coil arrangement is proposed. It comprises a regulating means having a measuring arrangement for measuring the coil current and adapted to regulate the coil current in a manner dependent on the measured coil amperage, means for producing a attraction current, which regulated by clock pulse switching, flowing through the solenoid coil arrangement and a switching over means for reducing the coil current after elapse of an attraction time to a lower clock pulse switched hold current flowing until the end of a switch signal. The measuring arrangement is switched outside the freewheel circuit in which during the freewheel condition, existing in clock pulse switching intervals, of the solenoid coil arrangement the freewheel current flows. This means that the input voltage does not have to be adapted to the desired attraction current and the freewheel current does not produce any power loss in the measurement arrangement.

14 Claims, 2 Drawing Sheets

CIRCUIT DEVICE

BACKGROUND OF THE INVENTION

Figure 1:
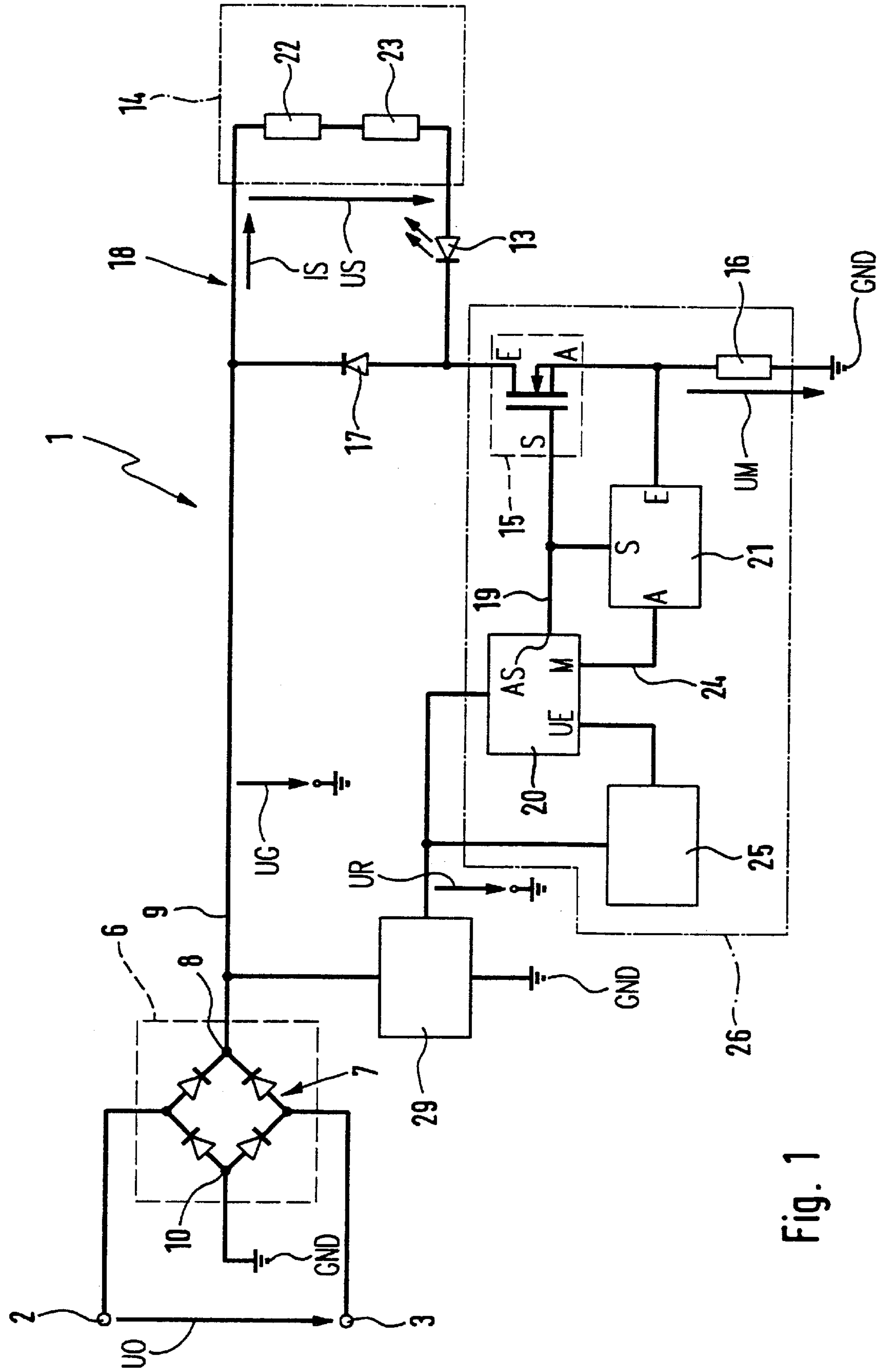

The invention relates to a circuit device for the regulation of the current flowing through a solenoid coil arrangement, comprising a regulating means having a measuring arrangement for measuring the coil current and adapted to regulate the coil current in a manner dependent on the measured coil amperage, means for producing an attraction current flowing through the solenoid coil arrangement and a switching over means for reducing the coil current after elapse of an attraction time to a lower switched hold current flowing until the end of a switch signal.

In such circuit devices the attraction current present during the time of attraction is clock pulse switched down after the elapse of this attraction time, a freewheel current being induced in the solenoid coil arrangement in the switching intervals, that is to say with the power supply disconnected, so that a large power loss is produced. Furthermore the input voltage supplying the circuit device must be adapted to the desired current level of the attraction current and thus be present in the form of DC having a predetermined voltage value.

SHORT SUMMARY OF THE INVENTION

One object of the invention is accordingly to create a circuit device of the type initially mentioned which involves a substantially lower power loss while at the same time being able to be run on substantially any voltage.

In order to achieve these and/or other objects appearing from the present specification, claims and drawings, in the present invention the attraction current is also regulated by clock pulse switching and the measuring arrangement is switched outside the freewheel circuit in which during the freewheel conditions existing in clock pulse switching intervals, of the solenoid coil arrangement the freewheel current flows.

Owing to the clock pulse switching of the attraction current it is possible for the input voltage serving for supply of the circuit device to assume voltage values larger than the desired voltage value, since the clock pulse switching means that the effective value of the input voltage may be reduced. The value of the input voltage does consequently not have to be adapted, as hitherto, to the desired attraction current. Because the measuring arrangement is switched outside the freewheel current circuit, in the clock pulse switching intervals, in which the solenoid coil arrangement assumes its freewheel condition and is not connected with the supply voltage, the freewheel current induced by the solenoid coil arrangement does not flow through the measuring arrangement. The consequence of this is that the freewheel current does not produce any power loss in the measuring arrangement. The overall power loss occurring is accordingly substantially reduced and offers measurement advantages.

Further developments of the invention are defined in the claims.

It is convenient for a rectifier arrangement to be provided, which converts an input voltage into a supply voltage serving for power supply of the device. In this manner it is possible for the circuit device to be connected with a direct or alternating voltage source as an input voltage.

It is an advantage however to have a clock pulse switched voltage or current source for voltage or, respectively, current supply of the regulating means, the supply voltage of such source being equal to the supply voltage of the solenoid coil arrangement. The regulating means is accordingly supplied from the supply voltage, serving for supply of the solenoid coil arrangement, using the clock pulse switched voltage or current source so that no additional input voltage is necessary for the supply of the regulating means.

Further advantageous developments and convenient forms of the novel circuit design will be understood from the following detailed descriptive disclosure of one embodiment thereof in conjunction with the accompanying drawings.

LIST OF THE SEVERAL VIEWS OF THE FIGURES

FIG. 1 shows a working embodiment of a circuit device.

Figures 2A, 2B, 2C:
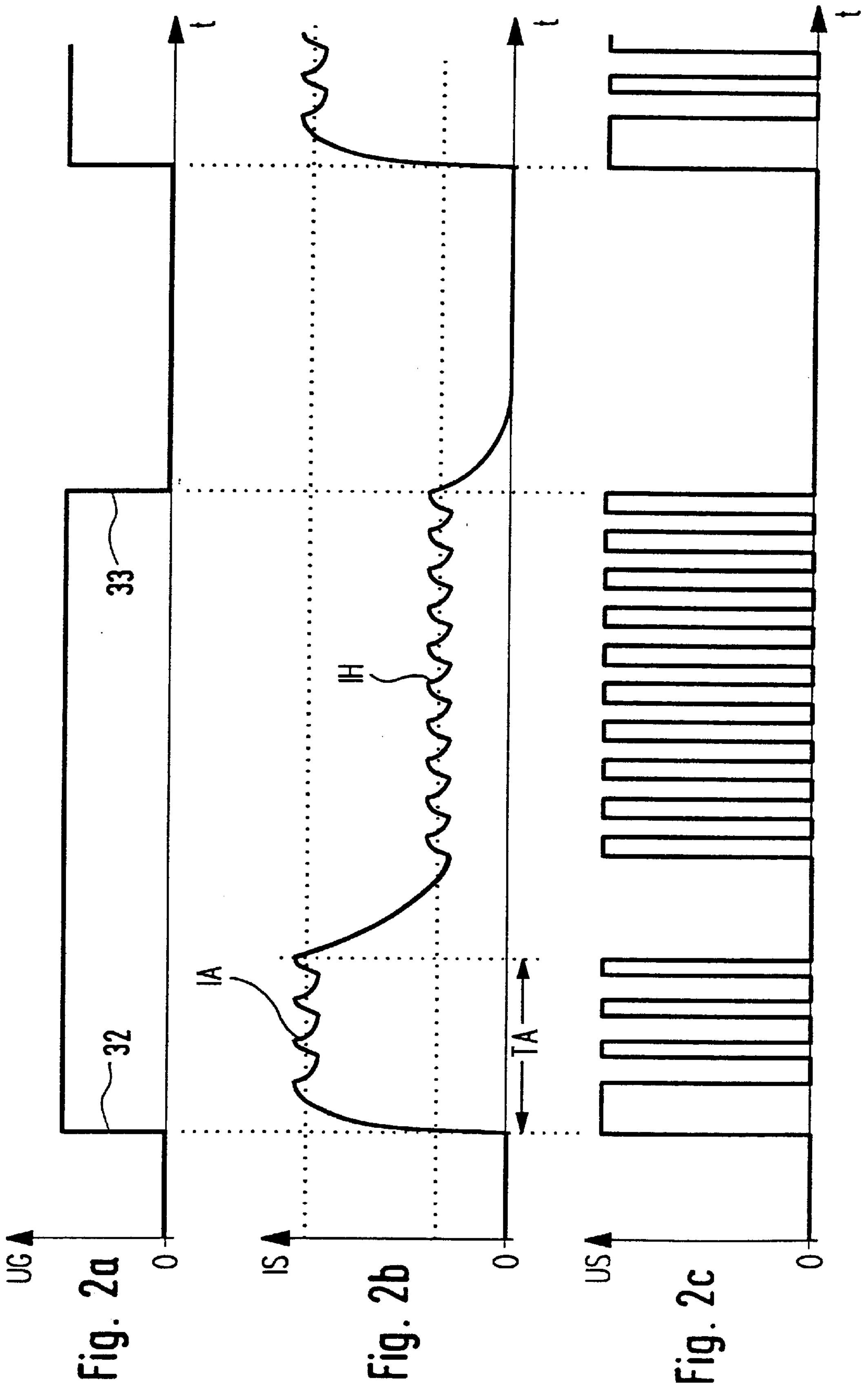

FIG. 2*a* shows changes, selected by way of example, in the input voltage against time.

FIG. 2*b* shows changes in the switched coil current against time.

FIG. 2*c* shows changes in the switched coil current against time.

DETAILED ACCOUNT OF WORKING EMBODIMENT OF THE INVENTION

FIG. 1 shows a working embodiment of the circuit device 1. The circuit device 1 comprises two input terminals 2 and 3, to which an input voltage UO may be applied. The input terminals 2 and 3 are connected with a rectifier arrangement 6, which for example is constituted by a diode bridge circuit 7. By means of the rectifier arrangement constituted by the diode bridge circuit the input voltage UO is converted into the supply direct voltage UG. The plus pole of the supply direct voltage U is connected with a positive output 8 of the rectifier arrangement 6, which is connected with a supply line 9, and negative output 10 of the rectifier arrangement 6, which is connected with the minus pole of the supply direct voltage, is connected with the ground potential GND (0 volt). Between the supply line 9 and the ground potential GND the supply direct voltage UG is present.

As a modification of the preferred embodiment in accordance with FIG. 1 it is possible to provide a smoothing capacitor.

The circuit device 1 furthermore includes a solenoid coil arrangement 14, which on the one hand is connected with the supply line 9 and on the other hand is connected via a series circuit arrangement composed of an LED 13, the circuit part between the input E and the output A of a controlled switch 15 and a measuring resistance 16 with ground GND.

In the present working embodiment the solenoid coil arrangement 14 is constituted by a single solenoid coil or winding, whose equivalent circuit is constituted by a series circuit arrangement made up of an ideal coil 22 and an ohmic coil resistance 23.

Parallel to the solenoid coil arrangement 14 and the LED 13 a freewheel diode 17 is connected, whose cathode connected with the supply line 9 and whose anode is thus connected with the input E of the controlled switch 15. The solenoid coil arrangement 14, the LED 13 and the freewheel diode 17 together constitute a freewheel circuit 18. In this connection it is to be pointed out that the LED 13 is optional and is not required for the operation of the switching arrangement 1. Furthermore it may be replaced by other indicating elements or also made more elaborate should this be desired. In the circuit device 1 of the example the LED 13 serves to optically indicate the coil current IS flowing through the solenoid coil arrangement 14. As soon as a coil current IS is flowing, the LED 13 will light up (indication of status).

A control input S serving for switching the controlled switch 15 on and off is connected via a control line 19 with a control output AS of a control unit 20. The control line 19 furthermore connects the control output AS of the control unit 20 with a further control input S of a controlled measuring switch 21, whose switching path is between an input E and an output A in a measuring line 24, which connects the connection end, remote from ground GND, of the measuring resistance 16 with a measuring input M of the control unit 20. When the measuring switch 21 is turned on there is accordingly the measurement current UM, produced as the drop across the measurement resistance 16, at the measurement input M of the control unit 20.

The controlled switch 15 and the controlled measurement switch 21 may for example be in the form of a semiconductor switches and more especially MOS-FETs. It is possible to utilize other types of semiconductor as controlled switches.

The control unit 20 furthermore possesses a switch over input UE, which is connected with a switching over means 25. The control unit 20, the controlled switch 15, the controlled measurement switch 21, the measurement resistance 16 and the switching over means 25 together constitute a regulating means 26. To supply the regulating means 26 with the necessary voltage there is for example a clock pulse switched voltage source 29, which at its output supplies a regulating means supply voltage UR, which in the present working example is connected with the control unit 20 and the switching over means 25 for the supply thereof. The clock pulse switching voltage source 29 is supplied with the supply direct voltage UG. Basically instead of the clock pulse switching voltage source 29 a clock pulse switching current source could be employed.

The function of the circuit device 1 will be explained in the following with reference to FIGS. 2*a* through 2*c*.

The solenoid coil arrangement 14 may for instance be constituted by the solenoid coil of a solenoid valve, a high attraction force IA being initially required for attraction of the valve spool, which may then be reduced for holding the attracted state to a lower hold current IH. Accordingly firstly the attraction current IA flows through the solenoid coil arrangement 14 during an attraction time TA and after the attraction time TA this current is reduced to the hold current IH.

In the resting state of the circuit device 1 the controlled switch 15 is open. As soon as the input voltage UO is applied from the outside, the supply direct voltage UG will have a rising edge 32 and the attraction time TA will begin to run. Furthermore the clock pulse switched voltage source 29 produces the regulating means supply voltage UR. The control unit 20 then causes the switch 15 to close.

Owing to the supply voltage UG there will be a coil voltage US at the solenoid coil arrangement 14, and this voltage US will cause there to be a coil current 15 essentially increasing exponentially. In a manner proportional to the coil current IS the measurement current UM across the measurement resistance 16 will increase. Since the measurement switch 21 like the controlled switch 15 as well is driven by means of the control output AS of the control unit 20, same is also closed so that the measurement voltage UM will be present at the measurement input M of the control unit 20. The coil current IS will practically completely flow through the measurement resistance 16. It is an advantage for the measurement input M to be high ohmic so that the current flowing via the measurement line 24 in the control unit 20 is low.

As a modification of the working example illustrated it would also be possible for the controlled switch 15 and the controlled measurement switch 21 to be driven from separate drive outputs of the control unit 20.

A processing means of the control unit 20 now compares the measured value of the measurement voltage UM with an internal reference voltage, the controlled switch 15 being opened and closed in a manner dependent on the result of comparison.

When the switch 15 is open no valid measurement signal is present at the measurement resistance 16, since it is free of current, although in the freewheel circuit 18 a freewheel current induced by the solenoid coil arrangement 14 is flowing. For this reason the measurement switch 21 is also open so that there will be no signal at the measurement input M of the control unit 20. In the working embodiment the measurement switch 21 possesses measurement value storage means in the form of a so-called sample and hold element, which holds the voltage value supplied to the measurement input M of the control unit until the measurement switch 21 and accordingly also the controlled switch 15 are closed again and the next valid measurement value is present and accordingly the measurement input M of the control unit 20 constantly receives a valid measurement value from the measurement switch 21. It will be clear the measurement value storage means may also as an alternative be integrated in the control unit 20.

The internal reference voltage of the control unit 20 could for instance have a triangular pulse form and be compared with the differential voltage equal to the intended value of the measurement voltage UM less the actual value of the measurement voltage UM. At each "intersection" between the differential voltage and the reference voltage the controlled switch 15 is switched over. If the differential voltage is larger than the reference voltage, the controlled switch 15 is opened and in the other case it will be closed. This principle is disclosed in the German patent publication 29,600,866. Basically any type of regulation method could be employed.

When the switch 15 is open the solenoid coil arrangement 14 is switched over into the freewheel state, the coil 22 having the freewheel current induced in it, which flows in the freewheel current circuit 18. Because the measurement resistance 16 is cut off from the freewheel current circuit 18 by the opened switch 15, no current flows in the circuit 18 so that no power loss is produced therein. Furthermore the control unit 20 of the regulating means 26 is protected against excessive voltages, that is to say against transient voltage surges produced on opening the switch 15 in the induced freewheel current, which would produce extremely high measurement current peaks in the measurement resistance 16. Such voltage surges in the measurement voltage UM are prevented owing to the separation of the measurement resistance 16 from the freewheel current circuit 18.

After elapse of the attraction time TA the switching over means 25 will lead to a switching over signal at the switching over input UE of the control unit 20 so that the coil current IS will be reduced from its attraction current value to the value corresponding to hold current IH. The regulation of the hold current IH is performed in this case in a manner similar to that of the attraction current IA by clock pulse switching with the difference that the desired value of the measurement voltage UM is correspondingly less at the measurement resistance 16. The hold current IH flows through the solenoid coil arrangement 14 until the supply direct voltage UG is also switched off by switching off the input voltage UO as well and has a declining edge 33. The coil current IS is then reduced exponentially down to zero. The input voltage UO and, respectively, the supply direct voltage UG constitute a switching signal, which on switching the input voltage UO or, respectively, the supply DC UG set the beginning of the attraction phase and on switching off the input voltage UO or, respectively, the supply DC UG set the end of the hold phase. Switching off of the input voltage UO and accordingly of the supply DC UG during the attraction time would serve no useful purpose, since then reliable attraction of the valve spool is not possible. The attraction time TA is preferably selected to be just long enough for the solenoid coil arrangement 14 of the solenoid valve to switch over the associated valve spool reliably.

Owing to the rectifier arrangement 6 the input voltage UO may be direct or alternating. The size of the input voltage UO is in this respect to be so selected that it at least ensures the attraction current IA flowing during the attraction time through the solenoid coil arrangement 14. Greater input voltages UO than the required minimum value are also possible in the circuit device 1 of the invention, since both the attraction current IA and also the hold current IH may be reduced by clock pulse switching. For instance it is possible for the input voltage UO to be within a range of 24 V and 230 V direct or alternating voltage.

The clock pulse switched voltage source 29 is also supplied from the supply DC UG and at its output provides the clock pulse switched supply voltage UR for the regulated regulation means so that no separate external voltage supply is necessary for the regulation means 26 either. The regulation means supply voltage UR necessary for the supply of the regulation means 26 is produced by means of the switched voltage source 29 and the rectifier arrangement 6 from the input voltage UO.

What is claimed is:

1. A circuit device for the regulation of the current flowing through a solenoid coil arrangement, comprising an input voltage, a DC power supply coupled to the input voltage, a clock pulse switched power source coupled to the DC power supply, the switched power source providing power to a regulating means, the regulating means having a measuring arrangement for measuring a coil current and adapted to regulate the coil current dependent on the measured coil current, the measuring arrangement comprising a measurement resistance connected in series with the solenoid coil arrangement and having a measurement voltage associated therewith, means for producing an attraction current flowing through the solenoid coil arrangement and the regulating means including a switching over means responsive to the clock pulse switched power source for reducing the coil current after elapse of an attraction time to a lower hold current flowing until the end of a switch signal, wherein the attraction current is regulated by clock pulse switching, and a freewheel circuit, wherein the measurement voltage associated with the measurement resistance is provided to a processing means for comparing the measurement voltage with a reference voltage to generate an output, the processing means output being provided to a switch for terminating the measurement voltage when the freewheel circuit is in a freewheel condition during switching intervals when freewheel current flows through the solenoid coil arrangement, and further wherein the input voltage can vary within a wide range since the attraction current and the hold current can be regulated by clock pulse control.

2. The circuit device as set forth in claim 1, wherein the regulation means comprises a semiconductor switch, the switch being connected in series with the solenoid coil arrangement so that the coil current may be turned on and off by the switch.

3. The circuit device as set forth in claim 2, wherein the switch is electrically coupled to the freewheel current circuit and the measurement arrangement.

4. The circuit device as set forth in claim 1, wherein the freewheel current circuit comprises at least the solenoid coil arrangement and a freewheel diode.

5. The circuit device as set forth in claim 4, further comprising an indicating means in the freewheel current circuit.

6. The circuit device as set forth in claim 1, comprising a rectifier arrangement to convert an input voltage into a supply direct voltage for voltage supply of the solenoid coil arrangement.

7. The circuit device as set forth in claim 6, wherein the rectifier arrangement comprises a diode bridge circuit.

8. The circuit device as set forth in claim 1, wherein the solenoid coil arrangement comprises a single solenoid coil.

9. The circuit device as set forth in claim 1, wherein the regulation means comprises measured data storage means for storage of the last measured value.

10. The circuit device as set forth in claim 9, wherein the measured storage means comprises a sample-and-hold element.

11. A circuit device for the regulation of current flowing through a solenoid coil arrangement comprising:

a supply of power including an input power source and a DC power supply coupled to the input power source for producing an attraction current in the solenoid coil arrangement and providing power to a clock pulse switched power source;

a freewheel diode connected in parallel to the solenoid coil arrangement having a cathode connected to the supply of power and an anode connected to an input of a control switch;

a measuring resistance coupled in series with the solenoid coil arrangement and control switch;

a control unit having an output coupled to the input of the control switch and an input of a measuring switch, the control unit further including a switch over input coupled to a switching over means; and a clock pulse switched power source coupled to the DC power supply and providing power to the control unit and the switching over means, wherein the switching over means reduces the initial attraction current which occurs at the beginning of a switch signal to a lower hold current flowing until an end of the switch signal via clock pulse switching and further wherein the attraction current is regulated by clock pulse switching such that power being supplied to the control unit causes the control switch and measuring switch to close thereby providing a measurement voltage across the measuring resistance to the control unit, the control unit including processing means for comparing the measurement voltage to an internal reference voltage, the control switch being opened and closed dependent upon an output of the processing means, wherein the input power source can vary over a wide range since the attraction current and the hold current can be regulated by clock pulse control, whereby the measurement voltage is only provided to the control unit when the control switch is closed, a freewheel current occurring when the control switch is open, thereby avoiding inaccurate measurement voltages due to the freewheel current.

12. A circuit device for the regulation of the current flowing through a solenoid coil arrangement, comprising an input power source, a DC power supply coupled to the input power source, a clock pulse switched power source coupled to the DC power supply, the clock pulse switched power source providing power to a regulating means so that no additional input power source is necessary for providing power to the regulating means, the regulating means having a measuring arrangement for measuring a coil current and adapted to regulate the coil current dependent on a measured coil current, means for producing an attraction current flowing through the solenoid coil arrangement and the regulating means including a switching over means responsive to the clock pulse switched power source for reducing the coil current after elapse of an attraction time to a lower hold current flowing until the end of a switch signal, wherein the attraction current is regulated by clock pulse switching, and a freewheel circuit, wherein the measuring arrangement is switched out of the freewheel circuit during the freewheel condition, existing in switching intervals wherein freewheel current flows through the solenoid coil arrangement.

13. A circuit device as set forth in claim 12, wherein the input power source can vary within a wide range since the attraction current and the hold current can be regulated by clock pulse control.

14. A circuit device as set forth in claim 13, wherein the input power source ranges from approximately 24 volts to approximately 230 volts.

* * * * *